United States Patent Office 3,313,773
Patented Apr. 11, 1967

3,313,773
PLATINUM ADDITION CATALYST SYSTEM
Harry F. Lamoreaux, Schenectady, N.Y., assignor to General Electric Company, a corporation of New York
No Drawing. Filed Dec. 3, 1965, Ser. No. 511,348
8 Claims. (Cl. 260—46.5)

This invention relates to the addition of Si-H containing organosilicon compounds to compounds containing aliphatic unsaturation. In particular, this invention relates to the use of a specific type of platinum compound catalyst for the addition of Si-H compounds to olefins and to catalyzed compositions containing such platinum compound catalysts.

In the manufacture and in the polymerization and curing of various organosilicon compounds, it has been customary to employ various platinum compound catalysts and complexes of various platinum compound catalysts. These catalysts have been selected because of their high efficiency in promoting the addition of Si-H groups to olefinically unsaturated double bonds. These platinum compound catalysts have included materials such as chloroplatinic acid, various platinum chloride-ethylene complexes, various platinum chloride-cyclopropane catalysts, various complexes derived by reacting alcohols, ethers, or aldehydes with chloroplatinic acid and other like materials.

However, in addition to being efficient for promoting Si-H olefin addition reactions, these platinum compound catalysts have also been extremely rapid. Therefore, it has been impossible to catalyze reaction mixtures containing both Si-H compositions and olefin compositions with these platinum compound catalysts prior to the time at which it was desired to effect the reaction, since the catalyst was somewhat effective even at room temperature, and within a few hours or a day or so the addition had been begun, indicating a low shelf life of catalyzed systems. Thus, where it has been desirable to use the Si-H olefin addition reaction as a mechanism for curing organopolysiloxanes at the point of use of the cured composition, it has been necessary to supply the composition in two separate packages, one of which contained the platinum compound catalyst along with some of the components of the curable composition, and the other of which contained the remaining components of the curable composition.

An object of the present invention is to provide an improved catalyst system which exhibits the efficiency of platinum compound catalysts, but which has a reactivity which is relatively low enough so that no significant reaction takes place at room temperature and so that the resulting catalyzed compositions have a reasonably long shelf life, e.g., a shelf life of from one to six months or more, at room temperature and at moderate elevated temperatures, such as temperatures of the order of from 20 to 50° C.

This and other objects of my invention are accomplished by providing a catalyzed composition comprising (A) a silicon compound containing at least one hydrogen atom attached to silicon per molecule, there being not more than two hydrogen atoms attached to any one silicon atom, (B) a compound containing aliphatic carbon atoms linked by multiple bonds and (C) a platinum compound catalyst selected from the class consisting of trimethylplatinum iodide, and hexamethyldiplatinum.

The catalyzed compositions of the present invention are stable at room temperature but react at elevated temperatures, e.g., temperatures of the order of from 75 to 150° C., to cause the addition of one or more of the Si-H groups of the silicon-hydrogen compound with the unsaturated compound to produce a product containing a new silicon-carbon linkage.

The trimethylplatinum iodide and the hexamethyldiplatinum employed in the practice of the present invention are operative for the addition of an unlimited class of silicon-hydrogen compounds to an unlimited class of unsaturated compounds containing a pair of aliphatic carbon atoms linked by multiple bonds to produce a product containing silicon-carbon bonds where no such bonds existed before reaction or to produce additional silicon-carbon bonds where one or both of the reactants had such bonds.

The general reaction involved in the present invention between the silicon-hydrogen compound and the unsaturated compound is illustrated by the following equation:

(1) 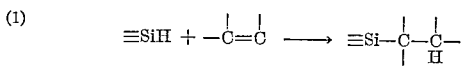

This reaction is well known in the art.

Both the trimethylplatinum iodide, $(CH_3)_3PI$, and the hexamethyldiplatinum, $(CH_3)_3Pt-Pt(CH_3)_3$, employed in the practice of the present invention are known in the art. Trimethylplatinum iodide is prepared by reacting the Grignard reagent of methyl iodide with platinic chloride. The hexamethyldiplatinum is prepared by the action of metallic sodium on trimethylplatinum iodide. Both the trimethylplatinum iodide and the hexamethyldiplatinum are crystalline materials, which are soluble in most organic solvents.

As an illustration of the addition reactions in which the trimethylplatinum iodide and hexamethyldiplatinum catalysts are operative, reference is made to Patents 2,823,-218—Speier et al., 2,970,150—Bailey, 3,159,601—Ashby, 3,159,662—Ashby, 3,197,432—Lamoreaux, 3,197,433—Lamoreaux, and 3,220,972—Lamoreaux. The trimethylplatinum iodide and hexamethyldiplatinum are applicable to every one of the addition reactions described in each of the aforementioned patents. Accordingly, the disclosures of each of the aofrementioned patents is hereby incorporated by reference into the present application as an illustration of the type of addition reactions in which the catalysts employed in the practice of the invention are useful.

The silicon-hydrogen compound containing the silicon-hydrogen linkage can be inorganic or organic and can be monomeric or polymeric. The only requirement of the silicon-hydrogen-containing reactant is that it contain at least one silicon-bonded hydrogen atom per molecule, with no more than two hydrogen atoms attached to any one silicon atom.

Among the inorganic monomeric materials which contain silicon-bonded hydrogen atoms and which are useful as reactants in the process of the present invention can be mentioned, for example, trichlorosilane and dibromosilane. Among the operable polymeric inorganic materials can be mentioned pentachlorodisilane, pentachlorodisiloxane, heptachlorotrisiloxane, etc.

Among the monomeric silicon compounds and organosilicon compounds containing silicon-hydrogen linkages which are operable in the present invention are those having the formula:

(2) 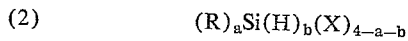

where X is a member selected from the class consisting of hydrogen, OR radicals and OOCR radicals, R can be any organic radical, but preferably is a member selected from the class consisting of monovalent hydrocarbon radicals, halogenated monovalent hydrocarbon radicals and cyanoalkyl radicals, $a$ has a value of from 0 to 3, inclusive, $b$ has a value of from 1 to 2, inclusive, and the sum of $a$ plus $b$ is from 1 to 4, inclusive.

Among the organopolysiloxanes operable in the practice of the present invention are polymers and copolymers containing up to one or more of the units having the formula:

(3) $\quad R_3SiO_{0.5}, R_2SiO, RSiO_{1.5}$ or $SiO_2$ along with at least one molecule having the formula:

(4) $RHSiO, R_2HSiO_{0.5}, HSiO_{1.5}, H_2SiO$ or $RH_2SiO_{0.5}$ where R is as previously defined. While any of the silicon-hydrogen compounds described above and included in the various patents mentioned above are operative in the practice of the present invention, it is preferred that the silicon-hydrogen compound be an organopolysiloxane, such as an organocyclopolysiloxane having the formula:

(5) $\quad (RHSiO)_c$ or an organopolysiloxane polymer or copolymer having the formula:

(6) $\quad (R)_d Si(H)_e O_{4-d-e/2}$ where R is as previously defined, $c$ has a value of at least 3, e.g., from 3 to 5 or more, $d$ has a value of from 0.5 to 2.49, $e$ has a value of from 0.001 to 1.0 and the sum of $d$ plus $e$ is equal to from 1.0 to 2.5.

The unsaturated compounds containing olefinic or acetylenic unsaturation which can react with the compounds described above containing the silicon-hydrogen linkage include substantially all of the aliphatically unsaturated compounds known to the art. Thus, the aliphatically unsaturated compound can be a monomeric or polymeric material. It can contain carbon and hydrogen only, or may also contain any other element or elements. Where the aliphatically unsaturated compound contains an element other than carbon and hydrogen, it is preferred that the other element be oxygen, a halogen, nitrogen, silicon, or mixtures of these other elements. The aliphatically unsaturated compound can contain a single pair of carbon atoms linked by multiple bonds or can contain a plurality of pairs of carbon atoms linked by multiple bonds. Among the many unsaturated hydrocarbons applicable to the present invention can be mentioned for purposes of illustration, ethylene, propylene, butylene, octylene, styrene, butadiene, pentadiene, pentene-2, divinylbenzene, vinylacetylene, etc. Preferably, the unsaturated compound is one containing no more than 20 to 30 carbon atoms in the chain.

Included among the oxygen-containing unsaturated compounds which can be employed in the practice of the present invention are methylvinyl ether, divinyl ether, phenylvinyl ether, the monoallyl ether of ethylene glycol, allyl aldehyde, methylvinyl ketone, phenylvinyl ketone, acrylic acid, methacrylic acid, methyl acrylate, phenyl methacrylate, vinyl acetic acid, vinyl octoate, vinyl acetate, oleic acid, linoleic acid, etc. Unsaturated compounds applicable in the present invention also include acyclic and heterocyclic materials containing aliphatic unsaturation in the ring. Included within this class of compounds are, for example, cyclohexene, cycloheptene, cyclopentadiene, dihydrofuran, dihydropyrene, etc. The sulfur analogs of any of the unsaturated oxygen-containing materials can also be employed in the practice of the present invention. In addition to compounds containing carbon, hydrogen, and oxygen, compounds containing other elements can also be employed. Thus, halogenated derivatives of any of the materials described above can be employed, including the acyl chlorides, as well as compounds containing a halogen substituent on a carbon atom other than a carbonyl carbon atom. Thus, applicable halogen-containing materials include, for example, vinyl chloride, the vinyl chlorophenyl esters, the allyl ester of trichloroacetic acid, etc.

Other types of unsaturated materials useful in the practice of the present invention include unsaturated materials containing nitrogen substituents, such as acrylonitrile, allyl-cyanide, nitroethylene, etc. The unsaturated compounds useful in the practice of the present invention also include polymeric materials containing aliphatic unsaturation, such as polyester resins prepared from polybasic saturated or unsaturated acids and polyhydric unsaturated alcohols and the polyester resins prepared by reacting unsaturated polybasic acids with saturated polyhydric alcohols. Thus, a suitable polyester is one prepared by condensing maleic acid with ethylene glycol.

One of the particularly useful types of unsaturated compounds which can be employed in the practice of the present invention are those compounds containing silicon, such as the materials commonly referred to as organosilicon monomers or polymers. The scope of the organosilicon compounds which are applicable to the process of the present invention is identical to the scope of the silicon-hydrogen compounds useful in the practice of the invention. The unsaturated organosilicon compounds are identical to the silicon-hydrogen compounds except that the silicon-bonded hydrogen is replaced by a silicon-bonded organic radical containing at least one pair of aliphatic carbon atoms linked with multiple bonds. Preferably, these organosilicon compounds are free of silicon-bonded hydrogen atoms, but it is also possible to employ organosilicon compounds containing both silicon-bonded hydrogens and silicon-bonded aliphatically unsaturated radicals.

The only requirement of these unsaturated organosilicon compounds is that there be at least one aliphatically unsaturated organic radical attached to silicon per molecule. Thus, the aliphatically unsaturated organosilicon compounds include silanes, polysilanes, siloxanes, silazanes, as well as monomeric or polymeric materials containing silicon atoms joined together by methylene or polymethylene groups or by phenylene groups.

Of the broad class of aliphatically unsaturated organosilicon compounds which can be employed in the practice of the present invention, there are three groups of such compounds which are preferred. One of these groups is the monomeric silanes having the formula (7) $\quad (Y)_m(Y')_n Si(X)_{4-m-n}$ where X is as previously defined, Y is a monovalent hydrocarbon radical of the scope previously defined for R, Y' is an organic radical containing at least one pair of aliphatic carbon atoms linked by multiple bonds, $m$ is equal to from 0 to 3, inclusive, $n$ is equal to from 1 to 4, inclusive, and the sum of $m$ plus $n$ is equal to from 1 to 4, inclusive.

A second class of preferred unsaturated organosilicon compounds are those cyclopolysiloxanes having the formula:

(8) $\quad (YY'SiO)_c$ where Y and Y' and $c$ are as previously defined. The third group of unsaturated organic silicon compounds preferred as those having the formula:

(9) $\quad (Y)_d(Y')_e SiO_{4-d-e/2}$ where Y, Y', $d$, $e$ and the sum of $d$ plus $e$ are as previously defined. All of the organic silicon compounds within the scope of Formulae 7, 8, and 9 are well known in the art and are prepared by conventional methods. Included among the organic silicon compounds within the scope of Formulae 7, 8, and 9 are the preferred types of material in which Y is methyl or a mixture of methyl and phenyl and in which Y' is an alkenyl radical, preferably vinyl or allyl.

Within the scope of Formula 7 are silanes, such as methylvinyldichlorosilane, vinyltrichlorosilane, allyltrichlorosilane, methylphenylvinylchlorosilane, phenylvinyldichlorosilane, diallyldichlorosilane, vinyl-beta-cyano-ethyldichlorosilane, etc. Included among the cyclic products within the scope of Formula 8 are, for example, the cyclic trimer of methylvinylsiloxane, the cyclic pentamer of methylvinylsiloxane, the cyclic tetramer of methylvinylsiloxane, the cyclic tetramer of vinylphenylsiloxane, etc.

Included within the scope of Formula 9 are the broad class of well known organopolysiloxanes which can be resinous materials, low viscosity fluids, or high molecular weight gummy materials. These polymeric materials are prepared by well known methods of hydrolysis and condensation of a particular diorganodichlorosilane or by the cohydrolysis and co-condensation of a mixture of several different diorganodichlorosilanes. Thus, products within the scope of Formula 9 can be prepared by the hydrolysis and condensation of vinyltrichlorosilane alone, divinyldichlorosilane alone, methylvinyldichlorosilane alone, phenylvinyldichlorosilane alone, or by the cohydrolysis and co-condensation of any of the aforementioned vinyl-containing chlorosilanes with one or more mono-organotrichlorosilane, diorganodichlorosilanes, triorganochlorosilanes, or silicon tetrachloride. While the hydrolysis and cohydrolysis above have been described in connection with vinyl-containing organosilicon compounds, it should be understood that in place of the vinyl group can be any silicon-bonded organic radical containing at least one pair of aliphatic carbon atoms linked by multiple bonds.

The relative amounts of the silicon-hydrogen compound and the unsaturated compound employed in the practice of the present invention can vary within extremely wide limits. In theory, one silicon-hydrogen bond is equivalent to one olefinic double bond or one-half acetylenic triple bond so that this equivalency establishes the general order of magnitude of the two reactants employed. However, for many purposes it can be desirable to employ an excess of one of the reactants to facilitate the completion of the reaction or to insure that the reaction product still contains either silicon-hydrogen bonds in the unreacted state, or still contains one or more pairs of carbon atoms linked by multiple bonds. In general, however, the ratios of the reactants are selected so that there are present from about 0.005 to 20 silicon-hydrogen linkages available in one reactant per pair of aliphatic carbon atoms linked by double bonds in the other reactant or from about 0.06 to 15 silicon-hydrogen linkages in one reactant per pair of aliphatic carbon atoms linked by triple bonds in the other reactant.

One of the advantages of the trimethylplatinum iodide and hexamethyldiplatinum catalysts of the present invention is that they are operative in very small quantities to catalyze the desired reaction between the silicon-hydrogen compound and the unsaturated compound. Thus, the catalysts can be used in concentrations as low as of the order of amounts necessary to provide one gram atom of platinum per billion moles of unsaturated groups in the unsaturated compound. While the catalysts are operative in such minute quantities, the desired addition reactions are generally effected with higher concentrations of catalyst. For example, concentrations as high as from 1 to 10 gram atoms of platinum per 1,000 moles of unsaturated groups in the unsaturated compound can be employed. Generally, the economics of the reaction dictates the particular level of catalyst, with the economics generally being a balance between the low catalyst cost obtained with low concentrations of catalyst and the higher reaction rates obtained with higher concentrations. A further advantage of low concentrations of catalyst is that it insures a low quantity of catalyst residue in the reaction products. In general, it has been found that satisfactory rates of reaction are obtained at the reaction temperatures when the catalyst is present in an amount sufficient to provide one gram atom of platinum per 1,000 moles of unsaturated groups to one mole of catalyst per million moles of aliphatically unsaturated groups in the unsaturated organic compound. Stated slightly differently, the amount of catalyst is selected to provide from $10^{-3}$ to $10^{-6}$ moles of platinum per mole of aliphatically unsaturated groups in the unsaturated organic compound.

Because the catalyst is a solid material and is employed in minute quantities, it is desirable to use the catalyst as a solution in a diluent to facilitate uniform dispersion of the catalyst in the reactants. However, it should be understood that the catalyst can be employed in undiluted form. Suitable diluents are any materials which are solvents for the catalyst and which are inert to the reactants under the conditions of the reaction. The preferred diluents are hydrocarbon solvents, such as aromatic hydrocarbons, including benzene, toluene, and xylene. However, aliphatic solvents, such as aliphatic mineral spirits, can also be employed. In addition to these hydrocarbon solvents, the diluent can be an alcohol or ether, such as octanol or tetrahydrofuran. Where a diluent is employed, the diluent is employed in an amount equal to from about 10 to 10,000 parts by weight diluent per part of the catalyst compound.

To effect the addition reactions with trimethylplatinum iodide or hexamethyldiplatinum, the reactants and the diluted catalysts are thoroughly mixed. Prior to the time at which it is desired to effect the addition reaction, the reaction mixture is maintained at room temperature or moderate temperatures. At a temperature of from about 20 to 50° C., an extended shelf life is obtained, e.g., a shelf life of from two to six months or more. When it is desired to effect the addition reaction, the reaction mixture is merely heated to the desired temperature, which is a temperature of the order of from 70 to 150° C. and the addition reaction is allowed to go to completion. The time required for the addition reaction is a function of temperature. At temperatures of the order of from 70 to 150° C., which is the preferred reaction temperature, the reaction times can run from a few minutes up to 12 hours or more, depending upon the particular reactants involved.

In some cases, in addition to employing a diluent for the catalyst, it is also desirable to employ also a solvent for one or both of the reactants. The amount of solvent employed is not critical and can vary without limit except for economic considerations. Any solvent can be employed which will dissolve the desired reactants and which is also inert to the reactants under the conditions of the reaction. In obvious cases, the same material can serve as both the diluent and the solvent.

Compositions employed in the practice of the present invention to produce cured, solid products, such as silicone elastomers or resins, can also contain various fillers, coloring agents, extenders, anti-oxidants, etc. Among the useful fillers are the various silica fillers, such as silica aerogel, fumed silica and precipitated silica, as well as other types of fillers, such as titanium dioxide, calcium silicate, ferric oxide, chromic oxide, cadmium sulfide, absestos, glass fibers, calcium carbonate, carbon black, lithopone, talc, etc. Preferably, the filler is a finely divided silica filler. The amount of filler employed can vary over an extremely wide range, e.g., from about 20 to 300 parts by weight filler per 100 parts by weight of the polysiloxane.

The following examples are illustrative of the practice of my invention and are not intended for purposes of limitation.

*Example 1.*—A mixture was prepared of 410 g. of 1,3,5,7 - tetramethylcyclotetrasiloxane and 590 g. of 1,3,5,7 - tetramethyl - 1,3,5,7-tetravinylcyclotetrasiloxane and enough of a saturated benzene solution of trimethylplatinum iodide to provide $10^{-5}$ g. atoms of platinum per mole of silicon-bonded vinyl groups. A portion of this reaction mixture was allowed to stand at room temperature for six months, during which time no increase in viscosity was observed. A portion of this reaction mixture was heated at 95° C. for 12 hours and rapidly cooled, at which time it exhibited a viscosity of 125 centistokes when measured at 25° C. A portion of this material was stored at room temperature for six months, during which time no increase in viscosity was observed. A number of films were cast from a portion of the prepolymer after the six months storage and these films were heated for 10 to 20 minutes at 125° C. to produce a clear, cured film of organopolysiloxane.

*Example 2.*—When the procedure of Example 1 was repeated except with hexamethyldiplatinum employed in an amount sufficient to provide $10^{-4}$ g. atoms platinum per mole of silicon-bonded vinyl groups, comparable results were obtained, i.e., a portion of the mixture was unchanged after six months at room temperature, a fluid with an increased viscosity of around 150 centistokes was obtained after heating for 10 hours at 95° C. which was stable for 6 months upon storage at room temperature and films of the material cured to the clear state in 5 minutes at 135° C. with no additional catalyst.

*Example 3.*—A curable silicone rubber compound is prepared by mixing (A) 500 parts of a methylphenylvinylpolysiloxane gum having a viscosity in excess of 10,000,000 centistokes at 25° C. and containing 0.2 mole percent methylvinylsiloxane units, 2 mole percent diphenylsiloxane units and the remaining units being dimethylsiloxane units with (B) 200 parts of finely divided fume silica, (C) 0.90 part of 1,3,5-tetramethylcyclotetrasiloxane and (D) a sufficient amount of hexamethyldiplatinum to provide one gram atom of platinum per 2,000 silicon-bonded vinyl groups. The hexamethyldiplatinum is added as a solution prepared by dissolving 5 parts of hexamethyldiplatinum into 100 parts of toluene. The ingredients are thoroughly milled and one portion is stored at room temperature for three months, during which time no change is observed. The remaining portion is heated at a temperature of 150° C. in a mold and post-baked for one hour in a circulating air oven at 150° C. to produce a cured silicone rubber.

*Example 4.*—Hexyltrichlorosilane is prepared by reacting equimolar amounts of trichlorosilane and hexene-1, in the presence of a sufficient amount of a trimethylplatinum iodide complex to provide $3 \times 10^{-5}$ gram atoms of platinum per mole of hexene-1. The catalyst is present in a solution prepared by dissolving one part of the trimethylplatinum iodide in 50 parts of toluene. This reaction mixture is heated at a temperature of 125° C. for 3 hours to produce hexyltrichlorosilane.

*Example 5.*—A mixture is prepared of dimethylhydrogensilyl chain-stopped dimethylpolysiloxane containing 2 mole percent dimethylhydrogensiloxane units and 98 mole percent dimethylsiloxane units and a sufficient amount of 1,1,3,3-tetramethyl-1,3-divinyldisiloxane to provide one mole silicon-bonded hydrogen atoms per mole of silicon-bonded vinyl radicals. The resulting solution is catalyzed by adding a sufficient amount of a saturated solution in hexane of hexamethyldiplatinum to provide $10^{-5}$ moles of platinum per mole of silicon-bonded vinyl groups. A portion of this reaction mixture is maintained at a temperature of 30° C. for three months, during which time no significant change in viscosity occurs. One portion of the material is heated at a temperature of 130° C. for 15 minutes to produce a tough, clear, cured gel.

While the foregoing examples have illustrated certain of the embodiments of the present invention, it should be understood that the invention is directed broadly to the addition of organosilicon compounds containing at least one hydrogen atom attached to silicon per molecule to substantially any organic compound containing aliphatic carbon atoms linked by multiple bonds in the presence of either trimethylplatinum iodide or hexamethyldiplatinum. The curable compositions of the present invention provide a useful vehicle for the preparation of valuable materials which are useful per se and, in some cases, are useful as intermediates in the production of more complicated products. For example, the hexyltrichlorosilane of Example 4 can be copolymerized with other organochlorosilanes to provide various organopolysiloxane materials containing hexyl groups. These materials can be useful as materials for rendering surfaces water-repellent and for other conventional silicone applications.

What I claim as new and desire to secure by Letters Patent of the United States is:

1. A catalyzed composition for the production of organosilicon compounds containing silicon-carbon bonds which comprises (A) a silicon compound containing at least one hydrogen atom attached to silicon per molecule, there being not more than two hydrogen atoms attached to any one silicon atom, (B) a compound containing aliphatic carbon atoms linked by multiple bonds and (C) a platinum compound selected from the class consisting of trimethylplatinum iodide and hexamethyldiplatinum.

2. The composition of claim 1 in which the platinum compound is trimethylplatinum iodide.

3. The composition of claim 1 in which the platinum compound is hexamethyldiplatinum.

4. A catalyzed composion of claim 1 in which silicon compound (A) has the formula:

$$(R)_d Si(H)_e O_{4-d-e/2}$$

where R is a member selected from the class consisting of monovalent hydrocarbon radicals, halogenated monovalent hydrocarbon radicals and cyanoalkyl radicals, $d$ has a value of from 0.5 to 2.49, $e$ has a value of from 0.001 to 1.0, and the sum of $d$ plus $e$ is equal to from 1.0 to 2.5.

5. The composition of claim 1 in which the compound containing aliphatic carbon atoms linked by multiple bonds has the formula:

$$(Y)_d (Y')_e SiO_{4-d-e/2}$$

where Y is a member selected from the class consisting of monovalent hydrocarbon radicals, halogenated monovalent hydrocarbon radicals and cyanoalkyl radicals, Y' is an organic radical containing at least one pair of aliphatic carbon atoms linked by multiple bonds, $d$ has a value of from 0.5 to 2.49, $e$ has a value of from 0.001 to 1.0, and the sum of $d$ plus $e$ is equal to from 1.0 to 2.5.

6. A process for the production of organosilicon compounds containing silicon-carbon bonds which comprises heating at temperatures of from about 75 to 150° C. a mixture of (A) a silicon compound containing at least one hydrogen atom attached to silicon per molecule, there being not more than two hydrogen atoms attached to any one silicon atom, with (B) a compound containing aliphatic carbon atoms linked by multiple bonds in the presence of (C) a platinum compound selected from the class consisting of trimethylplatinum iodide and hexamethyldiplatinum.

7. The process of claim 6 in which the platinum compound is trimethylplatinum iodide.

8. The process of claim 6 in which the platinum compound is hexamethyldiplatinum.

References Cited by the Examiner

UNITED STATES PATENTS

| | | | |
|---|---|---|---|
| 2,823,218 | 2/1958 | Speier et al. | 260—46.5 |
| 2,970,150 | 1/1961 | Bailey | 260—46.5 |
| 3,159,601 | 12/1964 | Ashby | 260—46.5 |
| 3,159,662 | 12/1964 | Ashby | 260—46.5 |
| 3,179,432 | 4/1965 | Chaneac et al. | 260—6 |
| 3,179,433 | 4/1965 | Flack | 260—8 |
| 3,197,432 | 7/1965 | Lamoreaux | 260—46.5 |
| 3,197,433 | 7/1965 | Lamoreaux | 260—46.5 |
| 3,220,972 | 11/1965 | Lamoreaux | 260—46.5 |

LEON J. BERCOVITZ, *Primary Examiner.*

M. J. MARQUIS, *Assistant Examiner.*